United States Patent
Lunin et al.

(10) Patent No.: US 10,022,829 B2
(45) Date of Patent: Jul. 17, 2018

(54) APPARATUS AND METHOD FOR DISCHARGE AND COMMINUTION OF A CHIP

(71) Applicant: SMS group GmbH, Duesseldorf (DE)

(72) Inventors: Paul Lunin, Moenchengladbach (DE); Bernhard Heimann, Moers (DE)

(73) Assignee: SMS group GmbH, Duesseldorf (DE)

( * ) Notice: Subject to any disclaimer, the term of this patent is extended or adjusted under 35 U.S.C. 154(b) by 511 days.

(21) Appl. No.: 14/810,744

(22) Filed: Jul. 28, 2015

(65) Prior Publication Data
US 2016/0031055 A1   Feb. 4, 2016

(30) Foreign Application Priority Data

Jul. 29, 2014   (DE) ........................ 10 2014 011 002

(51) Int. Cl.
| | |
|---|---|
| *B23Q 11/00* | (2006.01) |
| *B23D 79/02* | (2006.01) |
| *B02C 23/02* | (2006.01) |
| *B23Q 11/08* | (2006.01) |
| *B23B 25/02* | (2006.01) |

(52) U.S. Cl.
CPC .......... *B23Q 11/0057* (2013.01); *B02C 23/02* (2013.01); *B23B 25/02* (2013.01); *B23D 79/021* (2013.01); *B23Q 11/085* (2013.01)

(58) Field of Classification Search
CPC .................... B23Q 11/085; B23Q 11/0057; B23D 79/021; B23B 25/02; B02C 23/02
USPC .................................................. 241/30, 285.1
See application file for complete search history.

(56) References Cited

U.S. PATENT DOCUMENTS

| | | | | |
|---|---|---|---|---|
| 4,358,231 A | * | 11/1982 | Meier .................. | B23D 79/023 409/299 |
| 5,368,218 A | * | 11/1994 | Omura ................ | B21C 37/0811 228/125 |
| 6,092,753 A | | 7/2000 | Koenig | |
| 6,158,646 A | * | 12/2000 | Calvo, Sr. ........... | B21C 37/0811 228/125 |

(Continued)

FOREIGN PATENT DOCUMENTS

| | | |
|---|---|---|
| CN | 203184764 U | 9/2013 |
| DE | 2 048 260 A1 | 4/1972 |

(Continued)

OTHER PUBLICATIONS

Chinese Office Action in CN 201510450911.9, dated Feb. 22, 2017.
(Continued)

*Primary Examiner* — Omar Flores Sanchez
(74) *Attorney, Agent, or Firm* — Collard & Roe, P.C.

(57) ABSTRACT

In order to minimize the maintenance effort that accompanies discharge and comminution of a chip, an apparatus for discharge and comminution of a chip has a chip guide and a comminution apparatus, to which the chip guide guides the chip along a chip path. The chip guide has a guide channel that circumferentially surrounds the chip path having a channel inlet and a channel outlet, wherein the guide channel has a maintenance opening in addition to the channel inlet and the channel outlet. Furthermore, a method for discharge and comminution of a chip for this purpose services the guide channel by way of the maintenance opening after discharge and comminution of a chip having a predetermined chip length.

13 Claims, 4 Drawing Sheets

(56) References Cited

U.S. PATENT DOCUMENTS

| | | |
|---|---|---|
| 8,123,106 B2 | 2/2012 | Gleason |
| 2011/0232800 A1 | 9/2011 | Gleason |
| 2015/0059549 A1* | 3/2015 | Balta .................. B21C 37/0811 83/862 |

FOREIGN PATENT DOCUMENTS

| | | |
|---|---|---|
| EP | 1 238 736 A1 | 9/2002 |
| JP | H03 123655 U | 12/1991 |
| JP | H10-033846 A | 2/1998 |
| JP | 2002-263732 A | 9/2002 |
| JP | 2006-320812 A | 11/2006 |
| JP | 2009-291686 A | 12/2009 |

OTHER PUBLICATIONS

German Office Action dated Mar. 2, 2015 in German Application No. 10 2014 011 002.8 with English translation of relevant parts.
Japanese Office Action in JP 2015-135040, dated Jun. 13, 2017.
Notification of Reason for Refusal in JP 2015-135040 dated Oct. 4, 2016.

* cited by examiner

APPARATUS AND METHOD FOR DISCHARGE AND COMMINUTION OF A CHIP

CROSS REFERENCE TO RELATED APPLICATIONS

Applicant claims priority under 35 U.S.C. § 119 of German Application No. 10 2014 011 002.8 filed Jul. 29, 2014, the disclosure of which is incorporated by reference.

BACKGROUND OF THE INVENTION

1. Field of the Invention

The invention relates to an apparatus for discharge and comminution of a chip, having a chip guide and a comminution apparatus, to which the chip guide guides the chip along a chip path. The chip guide has a guide channel that circumferentially surrounds the chip path having a channel inlet and a channel outlet. Furthermore, the invention relates to a method for discharge and comminution of a chip, wherein the chip is guided in a guide channel along a chip path to a comminution apparatus, with which the chip is comminuted.

2. Description of the Related Art

Apparatuses and methods of the aforementioned type are particularly used in welding of pipes in what are called pipe welding systems. Pipe welding systems are used for the production of pipes welded with a longitudinal seam, wherein plates or—as an alternative—steel strips wound up into coils serve as the raw material. The coils are unwound and straightened in the strip preparation unit. Subsequently, the strip ends are cut off and welded to one another. This process is done in a transverse welding machine. In order for the entire pipe welding system not to have to be shut down during the welding process in the transverse welding machine, a spiral strip storage unit is used, which is filled with steel strip and continuously feeds the subsequent machines. After the spiral strip storage unit, the strip is guided into the strip forming unit, which consists of a pre-forming region and a forming region. In the pre-forming region, the strip edges are bent and the strip is slowly formed to be round. In the forming segment, generally consisting of three blade frames, the strip edges are brought together precisely, until they are finally pressed together and welded in the welding frame. In order to be able to remove the welding burr or welding chip that occurs during welding, immediately or as quickly as possible, outer burr removers are used. These devices use a scraping tool to remove the chip from the finished, welded pipe, by scraping it off. For welding, an inductive press-welding method with high-frequency currents is used, for example.

Apparatuses and methods of the type indicated above are known, for example, from EP 1 238 736 A1 and U.S. Pat. No. 8,123,106 B2, and are intended for discharging the scraped-off or removed chip and comminuting it, wherein a chip guide is provided for discharging or guiding the chip, which guide has a guide channel that circumferentially surrounds the chip path.

Because the scraped-off or discharged chip generally has very sharp edges and can have a temperature of up to 800° C., the guide channel that surrounds the chip path circumferentially offers effective protection against injuries.

In particular due to the circumstance that the discharged or scraped-off chip has very sharp edges and is very hot, regular maintenance of the apparatus for discharge and comminution of the chip is required after a certain period of use.

SUMMARY OF THE INVENTION

It is the task of the present invention to minimize the maintenance effort that accompanies discharge and comminution of a chip.

In this connection, the invention proceeds from the fundamental recognition or fundamental idea of minimizing the maintenance effort by means of suitable structural and process technology measures. Proceeding from this fundamental idea or fundamental recognition, apparatuses for discharge and comminution of a chip and a method for discharge and comminution of a chip, having the characteristics in accordance with the invention are proposed as concrete solutions. Further advantageous embodiments are found below.

An apparatus for discharge and comminution of a chip has a chip guide and a comminution apparatus, to which the chip guide guides the chip along a chip path. The chip guide has a guide channel that circumferentially surrounds the chip path having a channel inlet and a channel outlet. In this apparatus, the guide channel has a maintenance opening, in addition to the channel inlet and the channel outlet, in order to minimize the maintenance effort that accompanies discharge and comminution of a chip.

By means of providing a maintenance opening, the maintenance effort that accompanies discharge and comminution of a chip can be significantly minimized in that the interior of the guide channel does not have to be serviced, in complicated manner, in that maintenance can take place only by way of the channel inlet or channel outlet. Maintenance of the chip guide or of the guide channel can particularly be required if clogging of the channel by the chip comes about, for example as the result of non-uniform chip removal and an accompanying, corresponding movement of the removed chip. Access can be significantly improved by way of an additional opening, and the maintenance effort is correspondingly minimized as a result.

Furthermore, by providing the maintenance opening, maintenance that encompasses replacement of wear parts or replacement of a scraping tool coupled with the apparatus can also be carried out in simple and practical manner. As a result of the maintenance opening provided in addition to the channel inlet and the channel outlet, not only is maintenance carried out simply and practically, but also, cumulatively or alternatively, the maintenance effort for the apparatus is minimized significantly.

A chip guide and a comminution apparatus are provided, wherein the chip guide guides the chip along a chip path, to the comminution apparatus. In this connection, the chip path is understood to be the track curve of a point imagined to be in a fixed location with a chip section of the discharged chip. In this regard, the configuration of this track curve particularly depends on the movement direction and movement speed with which the removed chip enters into the guide channel by way of the channel inlet, on the inherent material tension of the chip, as well as on the manner in which a blade or scraper removes the chip. A further technical characteristic that influences the configuration of the track curve is, of course, also the chip guide or the configuration of the guide channel that circumferentially surrounds the chip path.

Viewed in total, the maintenance effort that accompanies discharge and comminution of a chip can be minimized by using the above apparatus, based on what has been explained above, because providing a maintenance opening represents a suitable structural measure for minimizing the maintenance effort.

Any desired comminution apparatus can be provided as a comminution apparatus for comminution of the chip, which apparatus is set up for comminuting the discharged chip. In particular, the comminution apparatus can comprise an actuator mechanism by way of which a severing element connected with the actuator mechanism can be moved to the chip, in order to sever a chip section or a chip piece from the chip, by way of the severing effect of the severing element. In this connection, the severing element can be configured, in particular, in the form of a severing blade or shearing tool.

Preferably, the maintenance opening can be closed off by way of a covering. The maintenance opening can be closed off in practical and simple manner by way of a covering, and thereby exiting of the chip out of the guide channel, by way of the maintenance opening, can be excluded during its discharge and comminution. Because the discharged chip generally has very sharp edges and can have a temperature of up to 800° C., work safety during discharge and comminution of the chip can be significantly increased by providing the closable covering.

In particular, the covering can be configured as a flap or slide, for example as a rotational slide, or also as a door or insert part that can be inserted into the maintenance opening.

Particularly preferably, the covering, preferably the flap, completes the guide channel in the closed state, to form a guide channel that circumferentially surrounds the chip path, which brings about a simple structure and—with a suitable design—also a wall of the guide channel that is as smooth as possible and free of edges. In this way, a guide channel can advantageously be made available, in the closed state, which is configured in the form of a guide channel that circumferentially surrounds the chip path, thereby making very effective guidance or discharge of the chip possible in spite of the advantageous maintenance opening that is present.

It is advantageous if the maintenance opening extends over the entire length of the guide channel. As a result of the expanse provided over the entire length of the guide channel, a maintenance opening designed to be correspondingly long can be made available, thereby making it possible to minimize the maintenance effort to a high degree, because of the accompanying improved accessibility.

Preferably, the guide channel can comprise a wall composed of a temperature-resistant and/or wear-resistant material. The chip guide or the guide channel is provided for guiding or passing the scraped-off chip or the scraped-off endless chip to the comminution apparatus. The scraped-off chip generally has very sharp edges and has a temperature up to 800° C., so that it moves or is pushed along the wall of the guide channel, all the way to the comminution apparatus, in this state. In order to withstand these stresses, the guide channel preferably comprises a wall composed of a temperature-resistant and/or wear-resistant material. In particular, the channel walls can particularly preferably consist, at least in part, of 31CrMoV9, for this purpose, and can also be nitrided, at least in part. Thus, the material can particularly have a surface hardness of more than HV 650.

An apparatus for discharge and comminution of a chip, having a chip guide and a comminution apparatus, to which the chip guide guides the chip along a chip path, wherein the chip guide has a guide channel that circumferentially surrounds the chip path, having a channel inlet and a channel outlet, can also be characterized in that the comminution apparatus comprises a severing element disposed on a replacement module, in order to minimize the maintenance effort that accompanies discharge and comminution of a chip.

By means of providing a comminution apparatus having a severing element disposed on a replacement module, replacement of the severing element provided for comminution of the chip can be implemented in simple and practical manner, thereby making it possible to significantly minimize the maintenance effort that accompanies replacement of the severing element—which can particularly be configured in the form of a severing blade. In this connection, a replacement module is understood to be a module or a device that can be removed from the comminution apparatus or disassembled and taken off it, and also can be affixed to the comminution apparatus again or installed on it. For this purpose, releasable shape-fit connections of any kind, such as, for example, formed-on parts and/or screw connections that are accommodated, with shape fit, in correspondingly configured accommodations, can particularly be provided. Preferably, removal or disassembly or taking off can preferably take place without disassembly of other modules; if necessary, the maintenance opening must be opened for this purpose.

In a state in which the replacement module is removed or disassembled from the comminution apparatus, the severing element—if it has a suitable design—can be removed from the replacement module in simple and practical manner, for the sake of replacement, because of the installation space that can be made available as a result of the disassembly or removal. The severing element can be affixed to the replacement module by way of a releasable screw connection, for example, for this purpose.

Minimizing the maintenance effort for replacement of the severing element in the manner described above is very advantageous as a result of the great mechanical stress on the severing element for comminution of the chip, because the great mechanical stress particularly leads to blunting and makes frequent replacement of the severing element necessary.

Preferably, the comminution apparatus comprises two severing elements that act in severing manner with one another, both of which are disposed on the replacement module. By means of providing two severing elements that act in severing manner with one another, very effective and operationally reliable comminution of the chip can be implemented by means of severing chip sections or chip pieces of the chip.

In a practical embodiment, the severing element is disposed on a carriage disposed so as to move in a carriage accommodation, and the carriage can be moved out of the carriage accommodation.

Disposing the severing element on a carriage disposed so as to move in a carriage accommodation, wherein the carriage can be moved out of the carriage accommodation, allows replacement of the severing element disposed on the carriage in simple and practical manner. For example, first, the carriage, along with the severing element, is moved out of the carriage accommodation, and subsequently, the severing element is removed or taken off the carriage for the purpose of replacing it with a severing element that preferably has the same construction or preferably has essentially the same construction. In this connection, the placement of the severing element on the carriage can particularly be such that the severing element is connected with the carriage by way of at least one screw connection, so that for simple replacement of the severing element, the screw connection must be released and subsequently restored again with the new or replaced severing element.

Preferably, at least one further severing element can be disposed on the replacement module, which is a severing element that acts in severing manner with the severing element disposed on the carriage, wherein the severing element on the carriage can be moved toward the further severing element by means of moving the carriage in the carriage accommodation. Particularly with this configuration, the simple replaceability of the severing element that is made available by the carriage accommodation and the carriage can advantageously be utilized also as a movement functionality, in order to be able to advantageously implement severing or removal of chip sections or chip pieces from the chip, for example in the manner of a guillotine, by moving the carriage, along with the severing element, toward the further severing element. For this purpose, the severing element and the further severing element can particularly be moved past one another—at a slight distance—by moving the carriage toward the further severing element. In this regard, the advantage of replaceability and also the advantage of a comminution possibility that can be implemented in simple and practical manner can also be implemented in structurally practical and compact manner.

Of course, the movability of the severing element made available by way of the carriage and the carriage accommodation can also be advantageously used for severing or removing chip sections or chip pieces, even without the further severing element—specifically in that the severing element is moved to the chip by way of the carriage and severing by the severing element is implemented by the impulse transferred to the chip by this movement.

Preferably, the carriage and/or the carriage accommodation consist(s), at least in part, of a material having a tensile strength that lies within a range of 950 Newton per square millimeter ($N/mm^2$) to 1,200 Newton per square millimeter ($N/mm^2$), preferably within a range of 1,000 Newton per square millimeter ($N/mm^2$) to 1,100 Newton per square millimeter ($N/mm^2$).

If the carriage is moved in the carriage accommodation at a high speed—for example in order to implement comminution of the chip by means of interaction of the severing element with a further severing element by means of moving them toward one another—the carriage and the carriage accommodation are exposed to great material stress as a result of the relative movement. The above tensile strength values are advantageously provided in order to significantly reduce or almost entirely preclude the wear that accompanies the material stress. The carriage and/or the carriage accommodation can preferably consist, in part or entirely, of a material in the form of a steel material or quenched and tempered steel. The quenched and tempered steel can particularly preferably be the quenched and tempered steel 51CrV4. The quenched and tempered steel 51CrV4 can be quenched and tempered by means of suitable quenching and tempering techniques, to a tensile strength within the above ranges, particularly to a tensile strength of 1,300 Newton per square millimeter ($N/mm^2$).

A method for discharge and comminution of a chip guides the chip in a guide channel along a chip path to a comminution apparatus, with which the chip is comminuted. In this method, the guide channel is serviced by way of a maintenance opening that is provided in addition to a channel inlet and a channel outlet, after discharge and comminution of a chip having a predetermined chip length, in order to minimize the maintenance effort that accompanies discharge and comminution of a chip. This method brings about the result, for example, that possible chip residues can be removed not exclusively through the channel inlet or through the channel outlet, but rather supplementally or exclusively through the maintenance opening.

As has already been explained above, the maintenance effort that accompanies discharge and comminution of a chip can be minimized by providing the maintenance opening. In the method, it is provided to undertake the maintenance of the apparatus being used, in each instance, after discharge and comminution of a chip having a predetermined chip length, wherein the predetermined chip length can particularly advantageously be a chip length based on empirical values, which, if exceeded, often results in impairments, for example due to clogging in the guide channel, so that when the predetermined chip length has been reached, maintenance should be performed by way of the maintenance opening.

On the basis of what has been explained above, the method for discharge and comminution of a chip particularly also represents a suitable measure of process technology for minimizing the maintenance effort that accompanies discharge and comminution of a chip.

It is understood that the characteristics of the solutions described above and in the claims can also be combined, if applicable, in order to be able to implement the advantages cumulatively, accordingly.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF THE PREFERRED EMBODIMENTS

Figure 1:
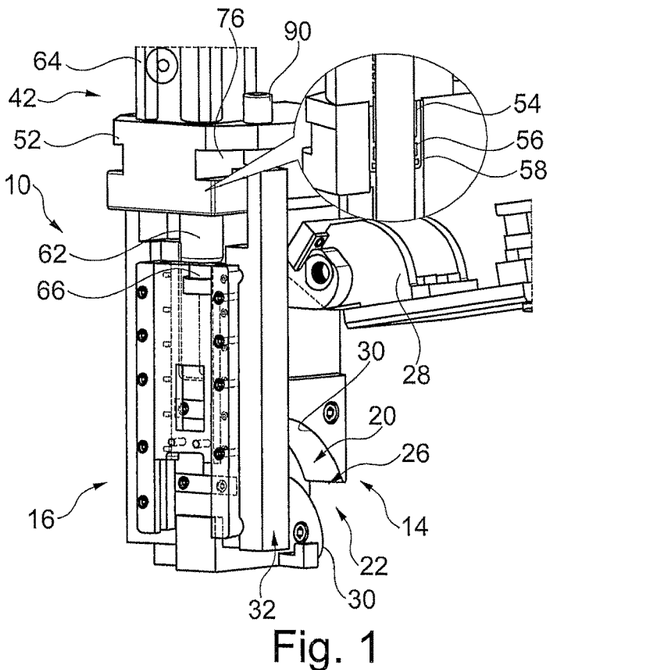
FIG. 1 shows schematically, a three-dimensional representation of an exemplary embodiment of an apparatus for discharge and comminution of a chip.

The apparatus 10 for discharge and comminution of a chip (not illustrated in the figures, aside from FIG. 6—there chip 12), shown schematically in FIG. 1, comprises a chip guide 14 and a comminution apparatus 16, to which the chip guide 14 guides the chip along a chip path.

Figure 3A:
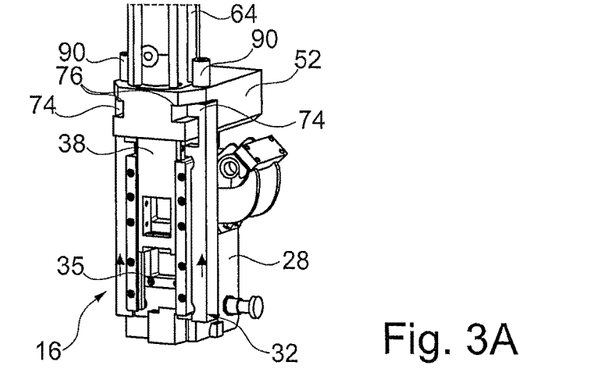
FIGS. 3A-3C show schematically, in each instance, partially sectional three-dimensional representations of the exemplary embodiment according to FIG. 1.
Figure 3B:
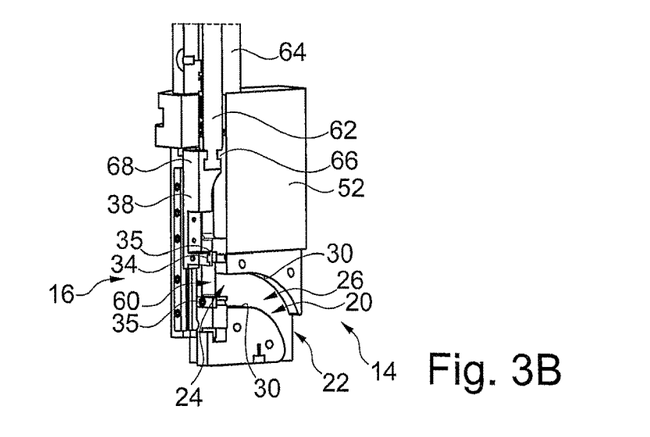
Figure 3C:
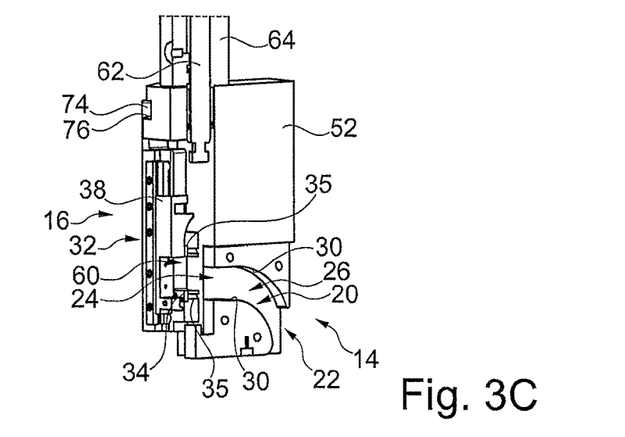

The chip guide 14—in the closed state of a flap 28 as a covering—has a guide channel 20 that circumferentially surrounds the chip path, having a channel inlet 22 and a channel outlet 24 (see also FIGS. 3B and 3C).

The apparatus 10 for discharge and comminution of a chip is provided for discharge and comminution of a chip 12 in the form or an outer chip or outer burr (see FIG. 6), which is formed when a pipe 86 is welded together in a pipe welding system (not illustrated). For this purpose, the apparatus 10 is lowered into the welded pipe 86 in the moving state of the welded pipe, wherein the chip 12, which has been scraped off by means of a scraping tool 88, is guided to the guide channel 20 by way of the channel inlet 22 of the guide channel 20. The chip guide 14 or the guide channel 20 then guide the chip 12 along a chip path to the comminution apparatus 16, by way of the channel outlet 24.

After exiting from the chip guide 14 by way of the channel outlet 24, which cannot be recognized in FIG. 1 but can be recognized in FIGS. 3B and 3C, comminution of the chip by means of the comminution apparatus 16 takes place.

The guide channel 20 has a maintenance opening 26 in addition to the channel inlet 22 and the channel outlet 24. The maintenance effort that accompanies discharge and comminution of a chip can be clearly reduced, by way of the maintenance opening 26, in that when a guide channel 20 is clogged up by a chip, for example, the channel is accessible by way of the maintenance opening 26, in simple and practical manner. It is therefore advantageously possible to do without maintenance that would have to be performed, in complicated manner, by way of the channel inlet 22 and/or the channel outlet 24, without provision of the maintenance opening 26.

In order to ensure effective guidance by means of the chip guide 14 when a chip is discharged, and also in order to improve work safety, the maintenance opening 26 can be closed off by way of the flap 28 (see, in particular, FIG. 1), wherein the flap 28, in the closed state, completes the guide channel 20 to form a guide channel 20 that circumferentially surrounds the chip path. The flap 28 is accommodated in articulated manner, to implement closability.

The maintenance opening 26 extends over the entire length of the guide channel 20, thereby making it possible to minimize the maintenance effort to a high degree, as a result of the accompanying improved accessibility.

The guide channel 20 furthermore has a wall 30 composed of a temperature-resistant and/or wear-resistant material having a surface hardness of more than HV 650.

Figure 4A:
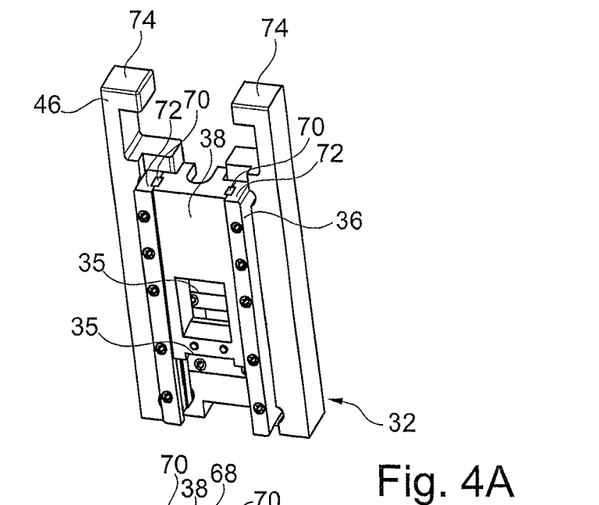
FIGS. 4A-4B shows schematically, in each instance, a three dimensional representation of the replacement module of the exemplary embodiment according to FIG. 1.
Figure 4B:
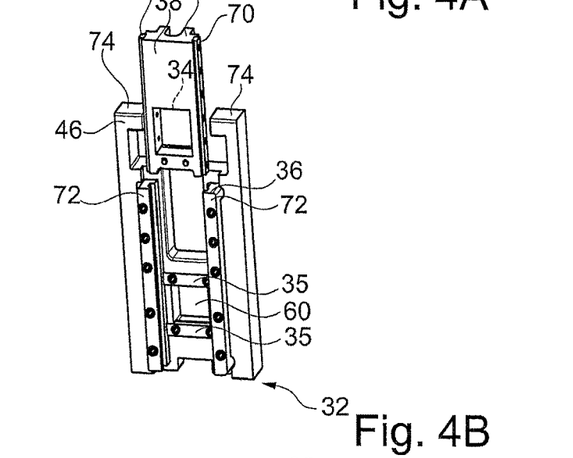
Figure 4C:
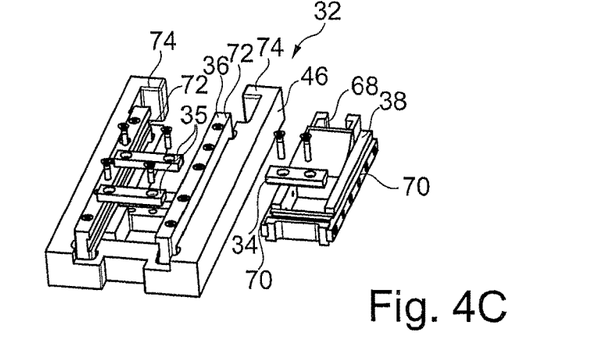
FIG. 4C is a schematic three-dimensional exploded representation of the replacement module of the exemplary embodiment according to FIG. 1.

The comminution apparatus 16 has a replacement module 32, the structure of which is illustrated in greater detail in FIGS. 4A to 4C. Severing elements 34 and 35 are disposed on the replacement module 32. The replacement module 32 has a carriage accommodation 36 and a carriage 38 that is disposed to move in the carriage accommodation. A severing element 34 is disposed in fixed manner on the carriage 38 of the replacement module 32, which carriage can be moved out of the carriage accommodation 36 (see FIG. 4B).

Two further severing elements 35 are disposed in fixed manner on a tool holder 46 of the replacement module 32—the severing element 34 is also disposed on the carriage 38 in fixed manner by means of screw connections (see FIG. 4C).

Each of the two further severing elements 35 is a severing element 35 that acts in severing manner with a severing element 34 disposed on the carriage 38. The severing element 34 on the carriage 38 can be moved toward the further severing element 35 by means of moving the carriage 38 in the carriage accommodation 36. This movability allows severing of chip pieces or chip sections that enter into or penetrate the elongated recess 60 provided on the tool holder 46, coming from the channel outlet 24, specifically in that the severing element 34 on the carriage 38 is guided past the further severing elements 35, at a slight distance from them, by being moved toward them (see also, in this regard, FIGS. 3B and 3C, in which the process of being guided past the elements is illustrated in greater detail schematically). The carriage 38 can thereby implement very effective comminution of the chip, by means of severing chip pieces or chip sections, in the manner of a guillotine, wherein very operationally reliable or very effective severing of chip sections is advantageously implemented by means of severing processes that follow one another, in terms of time, by means of providing the two further severing elements 35 disposed to follow one another in the movement direction of the carriage 38.

The carriage 38 is provided with two guide rails 70 that lie opposite one another and can be accommodated so as to move in the longitudinal direction in guides 72 provided on the carriage accommodation 36. The carriage accommodation 36, in turn, is firmly affixed to the tool holder 46 by way of screw connections.

The severing elements 34, 35 are represented only very schematically in the figures and are configured, in a concrete embodiment in this exemplary embodiment, in the form of a blade, in each instance, so that the severing element 34 provided on the carriage 38 represents a blade, and the two further severing element 35, which are provided on the tool holder 46, represent the counter-blades. After a certain period of use, the severing elements 34, 35 become blunt and must be replaced with new severing elements 34, 35 that are capable of functioning.

To replace the severing element 34, the carriage 38 can be moved out of the carriage accommodation 36 in simple and practical manner, as illustrated in FIG. 4B; subsequently, the severing element 34 can be removed from the carriage 38 by loosening the screw connections, and finally, a new severing element 34, which is capable of functioning and has the same construction, can be firmly affixed to the carriage 38 once again, by restoring the screw connections (see, in this regard, FIG. 4C). Analogously, accessibility to the tool holder 46, which is required to replace the further severing elements 35, can also be made available by moving the carriage 38 out of the carriage accommodation 36. The further severing elements 35, which are exposed in this manner, can then be separated from the tool holder 46 by loosening the screw connections provided, and replaced with new severing elements 35, which are capable of functioning and have the same construction, which elements in turn can be firmly disposed on the tool holder 46 by restoring the screw connections.

After the tool replacement has been performed in the manner described above, the replacement module 32 can then be affixed to the apparatus 10 again (see FIG. 1).

As has already been explained above, the movable placement of the carriage 38 in the carriage accommodation 36 also serves for comminution of the chip, wherein a piston/cylinder unit 42 (see FIG. 1, for example) is provided to comminute the chip, for this purpose, which unit has a piston 62 and a cylinder 64.

The piston 62 is provided with a circumferential recess 66, in order to implement a shape-fit connection with the carriage 38, into which recess a corresponding formed-on part 68 provided on the carriage 38 can engage in order to produce the shape fit (see also FIGS. 3B and 4B).

A movement of the piston 62 of the piston/cylinder unit 42 can then advantageously be converted into a corresponding translational movement of the carriage 38 in the carriage accommodation 36 by way of the shape-fit connection described above, in order to implement comminution of the chip by means of severing of chip sections or chip pieces, as explained above.

In order to improve the guidance of the piston 62 or of its piston rod, a guide bushing 54 is provided in a holder 52 of the apparatus 10, which bushing in turn is provided with a guide ring 56 and a stripper 58. The piston 62 can be cleaned of impurities by way of the stripper 58, and the guide ring 56 is advantageously provided for making available additional or stabilizing guidance.

By means of providing the comminution apparatus 16, it is possible to do without the use of a known notching roller, in particularly advantageous manner. With a known notching roller, notches that serve as planned breaking locations are introduced into the chip. The chip is then scraped off after the notching roller and breaks at the notches. The use of a known notching roller brings with it the disadvantage that when the notches are produced, very precise attention needs to be paid to the notch depth. If the notches are not deep enough, the chip does not break at every notch and grows in length. Long chips, however, are extremely dangerous and must be avoided. On the other hand, if the notching roller is set too deep, the chip breaks at every notch, so that markings remain on the pipe surface, which can lead to a reduction in surface quality. All of these disadvantages connected with the use of a notching roller are advantageously avoided by the use of the comminution apparatus 16.

In order to be able to dissipate the heat that occurs due to friction during movement of the carriage 38 in the carriage accommodation 36, to prevent disadvantageous overheating, the replacement module 32, in particular, can advantageously be cooled with an emulsion during ongoing operation. The use of an emulsion brings with it the advantage that both cooling and lubrication can take place in the regions or at the locations where friction occurs—in other words particularly the region between the carriage 38 and the carriage accommodation 36 or the region between the guide rails 70 and the guide 72.

The replacement module 32 can be removed from the apparatus 10 in simple and practical manner, as a replacement module (see FIG. 1, for example), and can also be affixed to the apparatus 10, specifically in a manner described below, using FIGS. 3A to 3C.

The replacement module 32 has two hook-shaped formed-on parts 74 that lie opposite one another, which can engage into straight-line grooves 76 provided on the holder 52 (see FIG. 3A, for example). In this connection, complete accommodation of the hook-shaped formed-on parts 74 in the grooves 76 can be prevented by way of two threaded pins 90, because the replacement module 32, which is guided on the apparatus 10 parallel to the longitudinal direction of the replacement module 32, can be hindered in its movability in the guidance direction by way of the threaded pins 90 as a stop. In this connection, FIG. 3A illustrates the situation in which the two hook-shaped formed-on parts 74 are entirely accommodated in the grooves 76 by means of being correspondingly pushed up or displaced. The threaded pins 90 have been correspondingly loosened or unscrewed. In this state, the replacement module 32 can then be released from the apparatus 10 as a whole in that the hook-shaped formed-on parts 74 are pulled out of the grooves 76 (see, in particular, FIG. 3C). When the replacement module 32 is pulled out, the carriage 38 will move downward in the carriage accommodation 36 under the effect of gravity, as the result of being released from the shape-fit accommodation on the piston 62 (see also the above explanations).

Furthermore (see FIGS. 2 and 5), a piston/cylinder unit 40 for translational movement of the entire apparatus 10 in a vertical direction is firmly affixed to the apparatus 10 for discharge and comminution of a chip. In this connection, the piston 80 of the piston/cylinder unit 40 is provided with a depression (not shown in any detail) that extends in the longitudinal direction of the piston 80, in which depression a rod 78 formed onto an attachment element 44 can be accommodated (see FIG. 2), to attach or affix the piston 80 to the attachment element 44.

Figures 5, 6:
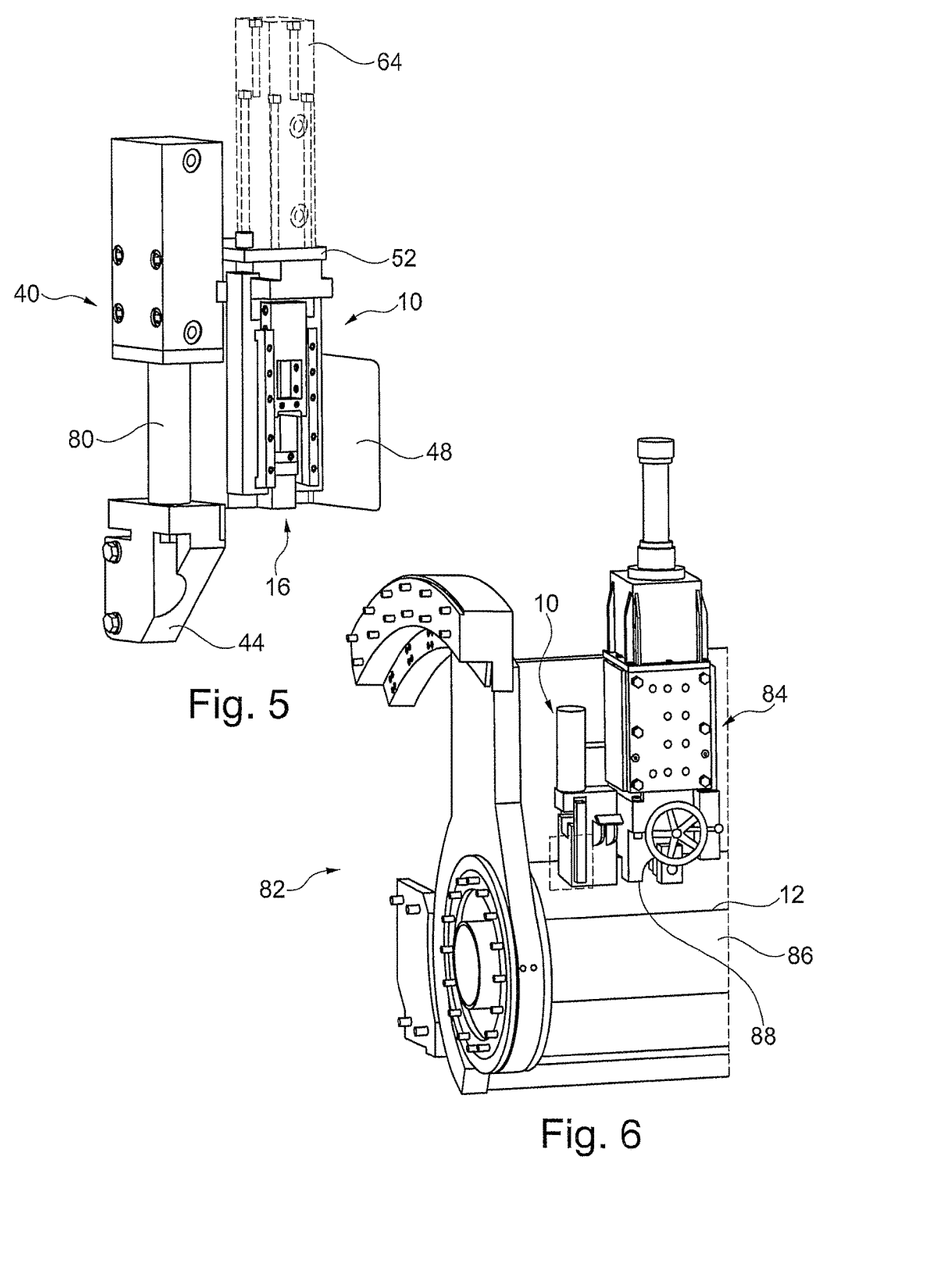
FIG. 5 is a schematic three-dimensional representation of the exemplary embodiment according to FIG. 1, together with an attachment element for attaching the apparatus to an outer burr remover and to a protective cover.
FIG. 6 is a schematic three-dimensional representation of the exemplary embodiment according to FIG. 1, together with a schematic three-dimensional representation of an outer burr remover, to which the apparatus according to the exemplary embodiment according to FIG. 1 is attached.

Translational and vertical movement of the entire apparatus 10 for discharge and comminution of a chip, relative to the attachment element 44, can be implemented by means of operation of the piston/cylinder unit 40—see also FIG. 5, which also illustrates that in this exemplary embodiment, a protective cover 48 is provided, in order to effectively prevent personnel or machine operators to reach into the hazard location in the surroundings of the comminution device 16, in particular, accompanied by an advantageous increase in work protection.

The attachment means 44 as such is provided for attaching the apparatus 10, along with the piston/cylinder unit 40, to an outer burr remover 82 (see FIG. 6). The outer burr remover 82 is provided for scraping off a chip 12 in the form of an outer chip or outer welding chip that forms during welding of the pipe 86 in the longitudinal direction of the same, in a pipe welding system. In this connection, a scraping tool 88 is provided on a deburring unit 84 for scraping, which tool is lowered onto the pipe in the moving state of the pipe 86, specifically by means of corresponding lowering of the deburring unit 84. The chip 12 that occurs during deburring or scraping is then guided to the apparatus 10 by way of the channel inlet 22 of the chip guide 14 (see FIG. 1, for example), wherein the chip guide 14 guides the chip 12 to the comminution apparatus 16, as has also been explained above. In order to also implement lowering of the apparatus 10 in the vertical direction, toward the pipe 86, the piston/cylinder unit 40 is provided—as has already been explained above—which is attached to the deburring unit 84 of the outer burr remover 82 by way of the attachment element 44.

Figure 2:
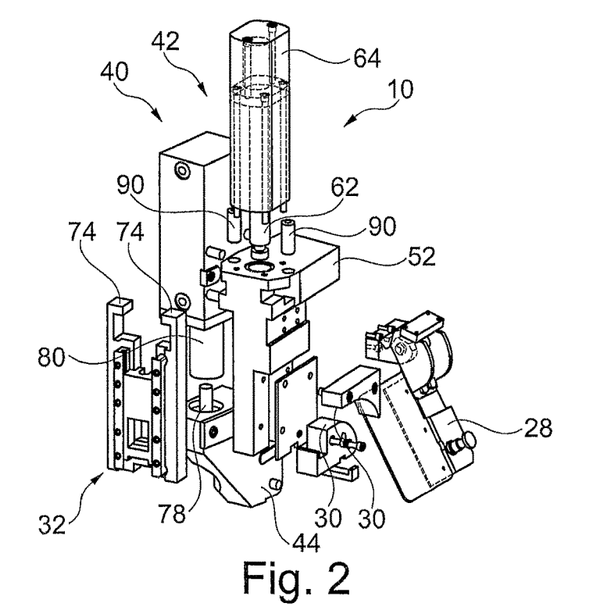
FIG. 2 is a schematic exploded representation of the exemplary embodiment according to FIG. 1; together with an attachment element for attaching the apparatus to an outer burr remover.

As is best illustrated using FIG. 2, the holder 52 represents a central element on which all the components of the apparatus 10 and further elements can be attached. In this connection, the holder 52 itself is configured in the form of a one-piece body. By providing the central holder 52, the number of screw connections can be advantageously minimized. This arrangement is particularly advantageous due to the circumstance that the vibrations that occur while the chip 12 is scraped off can lead to loosening of the screws, and for this reason it is advantageous to reduce the number of screw connections to a minimum. The piston/cylinder unit 40 is also attached to the holder 52.

In a method for discharge and comminution of a chip 12 using an apparatus 10, the chip 12 is guided in the guide channel 20, along a chip path, to the comminution apparatus 16 with which the chip 12 is comminuted, wherein the guide channel 20 can be serviced after discharge and comminution of the chip having a predetermined chip length, by way of the maintenance opening 26, which is provided in addition to the channel inlet 22 and the channel outlet 24 of the guide channel 20.

Although only a few embodiments of the present invention have been shown and described, it is to be understood that many changes and modifications may be made thereunto without departing from the spirit and scope of the invention.

What is claimed is:

1. An apparatus for discharge and comminution of a chip comprising:
   (a) a comminution apparatus comprising a first severing element;
   (b) a chip path; and
   (c) a chip guide guiding the chip along the chip path, said chip guide having a channel inlet, a channel outlet, and a maintenance opening;
   wherein the first severing element is disposed on a carriage disposed so as to move in a carriage accommodation; and
   wherein at least one of the carriage and the carriage accommodation comprises, at least in part, a material having a tensile strength of at least 950 Newton per square millimeter (N/mm$^2$).

2. The apparatus according to claim 1, further comprising a covering for closing off the maintenance opening.

3. The apparatus according to claim 2, wherein the covering comprises a flap.

4. The apparatus according to claim 2, the covering completes the guide channel in a closed state to form the guide channel.

5. The apparatus according to claim 1, wherein the guide channel has a length and the maintenance opening extends entirely over the length of the guide channel.

6. The apparatus according to claim 1, wherein the guide channel comprises a wall composed of at least one of a temperature-resistant material and a wear-resistant material.

7. An apparatus for discharge and comminution of a chip comprising:
   (a) a replacement module;
   (b) a comminution apparatus comprising a first severing element disposed on the replacement module;
   (c) a chip path; and
   (d) a chip guide guiding the chip along the chip path, said chip guide comprising a guide channel having a channel inlet and a channel outlet;
   wherein the first severing element is disposed on a carriage disposed so as to move in a carriage accommodation; and
   wherein at least one of the carriage and the carriage accommodation comprises, at least in part, a material having a tensile strength of at least 950 Newton per square millimeter (N/mm$^2$).

8. The apparatus according to claim 7, wherein the comminution apparatus further comprises a second severing element disposed on the replacement module, and
   wherein the first and second severing elements act in severing manner with one another.

9. The apparatus according to claim 7, wherein the carriage is movable out of the carriage accommodation.

10. The apparatus according to claim 9, further comprising a second severing element disposed on the replacement module and acting in severing manner with the first severing element disposed on the carriage, and
    wherein the first severing element on the carriage is movable toward the second severing element by moving the carriage in the carriage accommodation.

11. The apparatus according claim 7, wherein tensile strength a lies within a range of 950 Newton per square millimeter (N/mm$^2$) to 1,200 Newton per square millimeter (N/mm$^2$).

12. The apparatus according to claim 7, wherein the tensile strength lies within a range of 1,000 Newton per square millimeter (N/mm$^2$) to 1,100 Newton per square millimeter (N/mm$^2$).

13. A method for discharge and comminution of a chip having a predetermined chip length comprising:
    (a) guiding the chip in a guide channel along a chip path to a comminution apparatus;
    (b) comminuting the chip in the comminution apparatus;
    wherein the guide channel comprises a channel inlet, a channel outlet and a maintenance opening; and
    wherein the guide channel is serviced by way of the maintenance opening after discharge and comminution of the chip.

* * * * *

UNITED STATES PATENT AND TRADEMARK OFFICE
CERTIFICATE OF CORRECTION

PATENT NO. : 10,022,829 B2  
APPLICATION NO. : 14/810744  
DATED : July 17, 2018  
INVENTOR(S) : Lunin et al.

Page 1 of 1

It is certified that error appears in the above-identified patent and that said Letters Patent is hereby corrected as shown below:

In particular, In Column 12, Line 25, (Line 1 of Claim 11) after "wherein" please add: -- the --.

In Column 12, Line 26, (Line 2 of Claim 11) after "strength" please delete: "a".

Signed and Sealed this  
Twenty-first Day of August, 2018

Andrei Iancu  
*Director of the United States Patent and Trademark Office*